United States Patent [19]

Seki

[11] Patent Number: 5,206,883
[45] Date of Patent: Apr. 27, 1993

[54] VIOLATION CONTROL CIRCUIT IN ISDN

[75] Inventor: Akira Seki, Tokyo, Japan

[73] Assignee: Ando Electric Co., Ltd., Tokyo, Japan

[21] Appl. No.: 637,215

[22] Filed: Jan. 3, 1991

[30] Foreign Application Priority Data

May 8, 1990 [JP] Japan .................................. 2-117975

[51] Int. Cl.$^5$ .......................................... H04L 25/49
[52] U.S. Cl. ........................................ 375/20; 371/56
[58] Field of Search ............................ 375/17, 19, 20;
370/110.1, 110.4, 105; 371/30, 55, 56, 57.1,
57.2, 63, 72

[56] References Cited

U.S. PATENT DOCUMENTS 4,408,325 10/1983 Grover ......................... 370/110.4 X
4,962,509 10/1990 Itoh ..................................... 375/17

Primary Examiner—Curtis Kuntz
Assistant Examiner—Tesfaldet Bocure
Attorney, Agent, or Firm—Flynn, Thiel, Boutell & Tanis

[57] ABSTRACT

The present invention discloses a violation control circuit for a frame alignment of a basic interface in ISDN. The violation control circuit comprises selectors having inputs connected to positive and negative pulse transmission signals, a selector control circuit for providing control signals for selectively connect the inputs of the selectors to outputs of the selectors. The violation control circuit further comprises a U-B converter for receiving the outputs of the selectors, a transmission transformer for receiving an outut of the U-B converter, a receiving transformer for receiving a receiving pulse, a B-U converter for receiving an output of the receiving transformer, and an INFO detecting circuit to be connected to an output of the B-U converter.

7 Claims, 2 Drawing Sheets

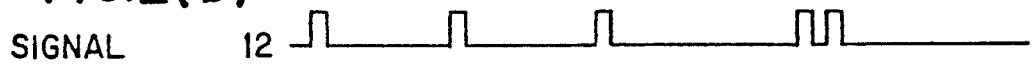
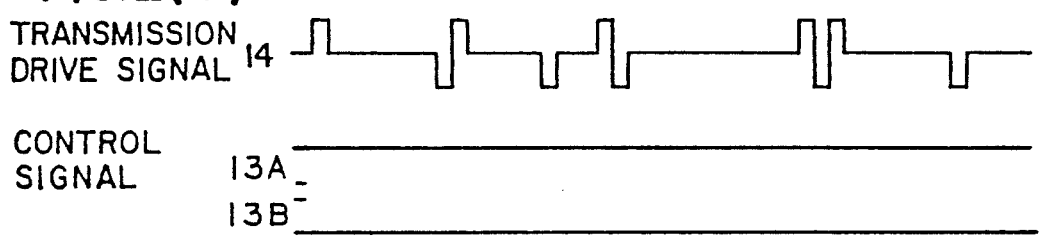
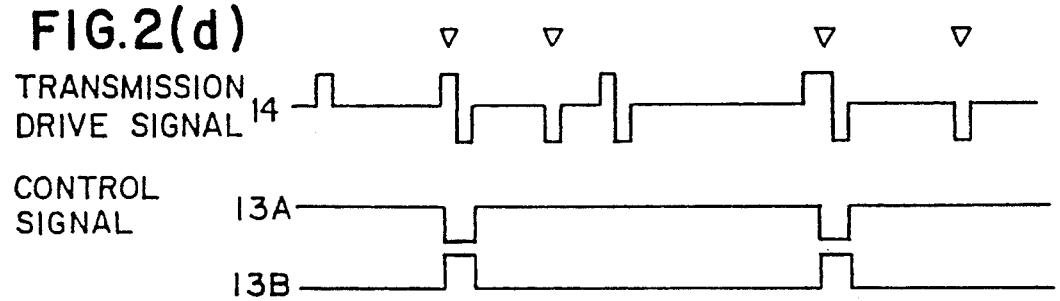
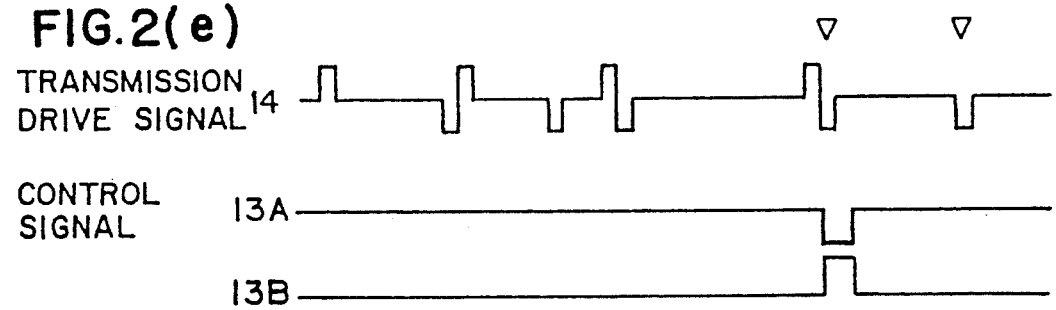
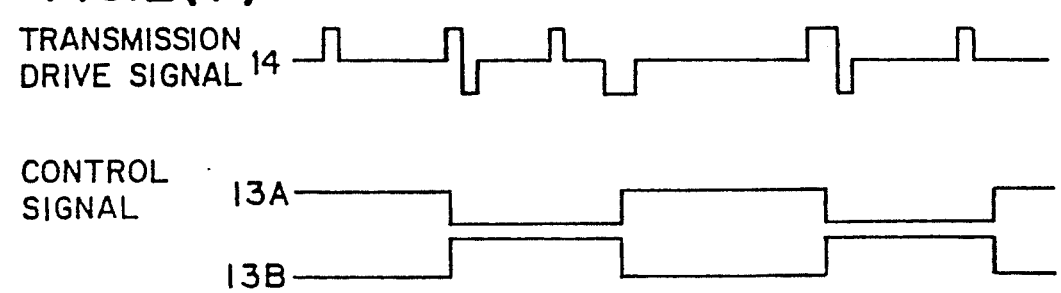

VIOLATION CONTROL CIRCUIT IN ISDN

BACKGROUND OF THE INVENTION

1. Field of the Invention

The present invention relates to a violation control circuit for a frame alignment of a basic interface in integrated services digital network (hereinafter referred to as ISDN).

2. Prior Art

In the basic interface in the ISDN, a frame alignment is established by detecting two times violations at a receiving side successively three times.

At the receiving side of a network termination (hereinafter referred to as NT) side, it is judged as a frame unalignment when the violation is not occured successively three times at the position where the frame unalignment bit is inserted.

At the receiving side of a terminal end (hereinafter referred to as TE) side, it is judged as a frame unalignment when the violation is not occured successively two times at the position where the frame alignment bit is inserted.

There is no concrete diagnosis for the frame alignment judging condition.

It is an object of the present invention to provide a violation control circuit in the ISDN capable of diagnosing the alignment guarding rule by preparing selector control signals for frame alignment, thereby generating a frame having the normal violation rule, enlarging or varying a violation generation range, or effecting the violation generation prohibition for unit frame so that the forward guarding stage and backward guarding stage of the frame alignment in the TE or a digital service unit (hereinafte referred to as DSU which corresponds to NT2). The forward guarding herein defines that when the number of occurences of the frame aligned state between the TE and the DSU exceeds a given value (guarding stage), it is judged as unaligned state (hereinafter referred to as unalignment). The backward guarding defines that when the number of occurences of frames aligned state exceeds a given value (guarding stage), it is judged as an aligned state (hereinafter referred to as alignment).

To achieve the object of the present invention, the violation control circuit in the ISDN comprises a first selector having a first input connected to a negative polarity pulse transmission signal and a second input connected to a positive polarity pulse transmission signal, a second selector having a third input connected to the positive polarity pulse transmission signal and a fourth input connected to the negative polarity pulse transmission signal, a selector control circuit for providing a first control signal to connect the first input of the first selector to a first output of the first selector and connect the third input of the second selector to a second output of the second selector and providing a second control signal to connect the second input 1B of the first selector to the first output of the first selector and connect the fourth input of the second selector to the second output of the second selector, a unipolar-bipolar converter (U-B converter) for receiving the first output of the first selector and the second output of the second selector, a transmission transformer for receiving an output of the U-B converter, a receiving transformer for receiving a receiving pulse, a bipolar-unipolar converter (B-U converter) for receiving an output of the receiving transformer, and an INFO detecting circuit to be connected to an output of the B-U converter.

The above and other objects, features and advantages of the present invention will become more apparent from the following description taken in conjunction with the accompanying drawings.

BRIEF DESCRIPTION OF THE DRAWINGS

FIG. 2 shows waveforms of assistance in explaining the operation of the arrangement in FIG. 1.

PREFERRED EMBODIMENT OF THE INVENTION

Figure 1:
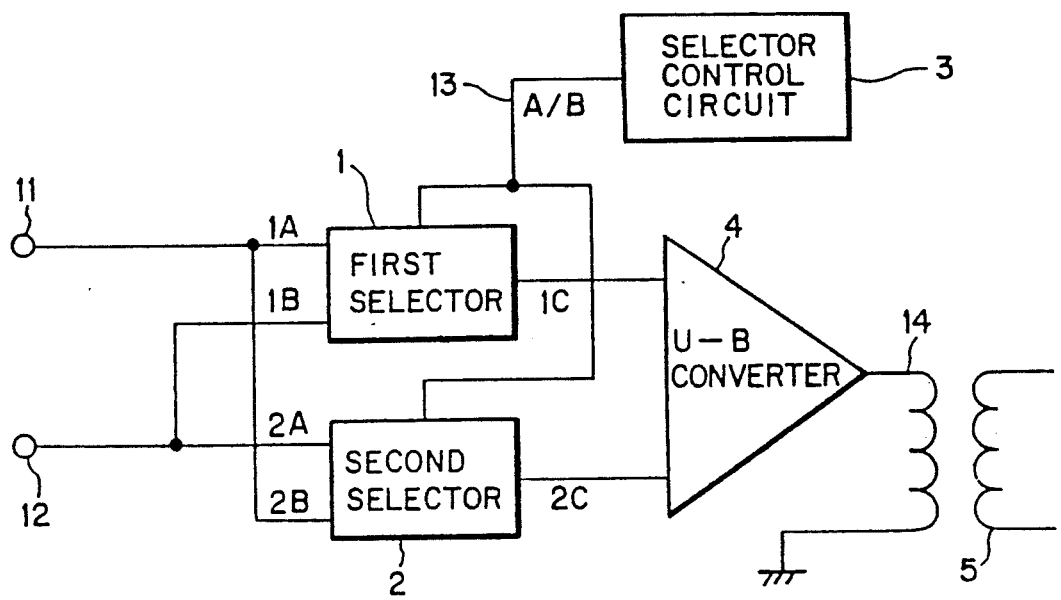
FIG. 1 is a block diagam showing an arrangement of a violation control circuit in an ISDN according to a preferred embodiment of the present invention.
Figure 1:
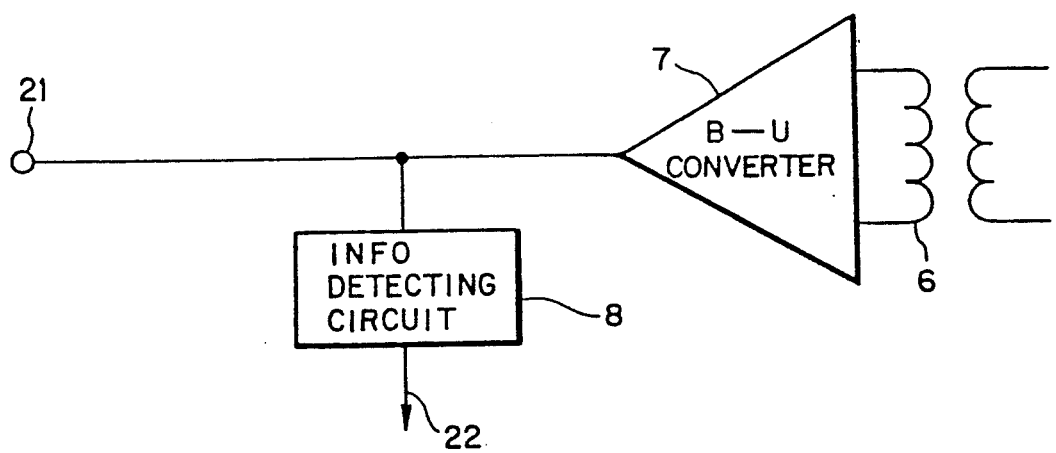

A violation control circuit in an ISDN according to a preferred embodiment of the present invention will be described with reference to FIGS. 1 and 2. For clarity in the following discussion, the term control signal 13A and the term control signal 13B are used to refer to respective logical states of a single control signal 13.

The violation control circuit in the ISDN comprises a first selector 1 having a first input 1A connected to a negative polarity pulse transmission signal 11 and a second input 1B connected to a positive polarity pulse transmission signal 12, a second selector 2 having a third input 2A connected to the positive polarity pulse transmission signal 12 and a fourth input 2B connected to the negative polarity pulse transmission signal 11, a selector control circuit 3 for providing a first control signal 13A to connect the first input 1A of the first selector 1 to a first output 1C of the first selector 1 and connect the third input 2A of the second selector 2 to a second output 2C of the second selector 2 and providing a second control signal 13B to connect the second input 1B of the first selector 1 to the first output 1C of the first selector 1 and connect the fourth input 2B of the second selector 2 to the second output 2C of the second selector 2, a unipolar-bipolar (hereinafter referred to as U-B) converter 4 for receiving the first output 1C of the first selector 1 and the second output 2C of the second selector 2, a transmission transformer 5 for receiving an outut of the U-B converter 4, a receiving transformer 6 for receiving a receiving pulse, a bipolar-unipolar (herfeinafter referred to as B-U) converter 7 for receiving an output of the receiving transformer 6, and an INFO detecting circuit 8 to be connected to an output of the B-U converter 7.

An operation of the violation control circuit in the ISDN will be described hereinafter.

A first appeared transmission bit becomes violation in association with a previously appeared transmission bit provided that the transmission bit is first appeared just after the control signal 13B or 13A is supplied to the first selector 1 or the second selector 2 instead of control signal 13A or 13B so that the outputs 1C and 2C of the first and the second selectors 1 and 2 are exchanged with each other and just after the control signals 13A and 13B are supplied to the first and the second selector 1 and 2 as usual so that the output 1C and 2C of the first and the second selectros 1 and 2 are provided as usual. Referring to FIG. 1, in the former case, the selector control circuit 3 provides the first control signal 13A to connect a second input 1B of the first selector 1 to a first output 1C of the first selector 1 and connect a fourth input 2B of the second selector 2 to a second output 2C of the second selector 2 and providing a second control signal 13B to connect the first input 1A of the first selector 1 to a first output 1C of the first selector 1 and connect the third input 2A of the second selector 2 to a second output 2C of the second selector 2 while in the latter case, the control circuit 3 provides the first control signal 13A to connect the first input 1A of the first selector 1 to a first output 1C of the first selector 1 and connect the third input 2A of the second selector 2 to a second output 2C of the second selector 2 and providing a second control signal 13B to connect a second input 1B of the first selector 1 to a first output 1C of the second selector 2 and connect a fourth input 2B of the second selector 2 to a second output 2C of the second selector 2. That is, there always generate same polarity pulses before and after the point where the control signals 13A and 13B are alternately supplied to the first and second selectors 1 and 2.

Two violation rules are guaranteed in the specific region among the frames if the pulse signal is appeared at the given position by effecting one set of operation of supply of the control signal 13B and 13A to the first and the second selectors 1 and 2 instead of supply of control signals 13A or 13B and supply of the control signal 13A or 13B to the first and second selectors 1 and 2 as usual every given time so that the outputs 1C and 2C are provided in exchange manner or as usual.

At this time, the control signals 13A and 13B for controlling the first and the second selectors 1 and 2 become given pulse signals which are aligned with the frame. Accordingly, it is possible to vary the violation generation range or prune the violation for each frame by changing patterns of the control signals 13A and 13B or prohibiting the control signals 13A or 13B from supplying alternately in the unit frame. The signals 11 and 12 are paired for transmitting a pulse in order to transmit "0" with use of an exclusive and alternate 100% alternate mark inversion (AMI) code.

The U-B conveter 4 receives the outputs 1C and 2C of the first and the second selectors 1 and 2 and converting the outputs 1C and 2C into a transmission drive signal 14 for driving the tranmission transformer 5.

The selectors 1 and 2 are so-called 2-1 type selectors, i.e., those for supplying the signals 11 and 12 to the U-B converter 4 in the manner that the outputs of the selectors 1 and 2 are supplied to the U-B converter 4 in parallel with each other as they are as illustrated in FIG. 1 or the outputs of the selectors 1 and 2 are crossed with each other to be exchanged and supplied to the U-B converter 4.

The discussion which follows refers to signals INFO0, INFO2, INFO3 and INFO4. These signals are not in and of themselves a part of the present invention, but are briefly described in order to facilitate a proper understanding of the present invention. Each of these signals uses a 48-bit format which is itself conventional and part of the ISDN specification. the INFO0 signal essentially has an information content of zero, and can be sent between the DSU and TE when synchronized communication between them is lacking. The INFO2 signal is sent repetitively by the DSU to the TE in an attempt to establish communication. When the TE determines that is it receiving the INFO2 signal, it responds by repetitively sending to the DSU the INFO3 signal. When the DSU determines that it is properly receiving the INFO3 signal, it sends the INFO4 signal to the TE to thereby advise the TE that it has recognized receipt of the INFO3 signal and that communication has now been established between the DSU and TE, which means that each is synchronized with the ISDN frames being sent to it by the other, or in other words that there is frame alignment with each unit.

The selector control circuit 3 controls the first and the second selects 1 and 2 at the same time on the basis of the control signals 13A and 13B.

When the control signal 13A is supplied to both the selectors 1 and 2, the outputs of the selectors 1 and 2 are supplied to the U-B converter 4 in parallel. When the control signal 13B is supplied to the selectors 1 and 2 the outputs of the selectors 1 and 2 are crossed or exchanged and then the crossed outputs are supplied to the U-B converter 4. The selector control circuit 3 in FIG. 1 switches the select signal 13 between two logical states according to a predetermined pattern, an example of which is shown at 13A in FIG. 2(d).

With the arrangement of the violation circuit according to the present invention, it is possible to supply an INFO 2 or an INFO 4 as the frame alignment pulse signal to the circuit in FIG. 1.

Meanwhile, it is possible to decode a receiving data 21 by the INFO detecting circuit 8 which data 21 is generated by converting a pluse received by the receiving transformer 6 into a unipolar by way of the B-U converter 7 in a layer 1 state at the terminal to be tested whereby the decoded receiving data can be taken out as an INFO signal 22.

The waveforms showing operation of the arrangement in FIG. 1 will be described with reference to FIG. 2.

FIG. 2(a) is a waveform of the signal 11 and FIG. 2(b) is a waveform of the signal 12. The waveforms as illustrated above in FIGS. 2(c) to 2(f) are respectively transformer drive signals and those as illustrated below in FIGS. 2(c) to 2(f) are waveforms of the control signals 13A and 13B. In particular, FIGS. 2(c) to 2(f) each show a particular example of the signal 13 and also show the signal 14 which would be generated by the circuit of FIG. 1 in response to that signal 13 and the signals 11 and 12 of FIGS. 2(a) and 2(b), with each violation bit in the signal 14 designated by an inverted triangle.

FIG. 2(c) shows the case where the control signal 13A is supplied to the first and the second selectors 1 and 2 and no violation is generated.

FIG. 2(d) shows the case where the signals 11 and 12 are crossed upon reception of the control signals 13A and 13B every frame at the position for two bits from the frame head, i.e., at the position extending over F bit and L bit. It is possible to obtain a normal frame alignment.

FIG. 2(f) is not the normal pattern as illustrated in FIG. 2(d). FIG. 2(f) shows an abnormal state wherein the control signals 13A and 13B are supplied to the selectors 1 and 2 so that the crossing times of the signals 11 and 12 are lengthened more than two bits from the frame head so that a second violation generating position in the frame is shifted backward from the position as stipulated in the CCITT Recommendation. The selector control circuit 3 in FIG. 1 can vary the relative periods of time during which the select signal 13 is in its respective logical states, as evident from the fact that the signal 13A in FIG. 2(f) has a duty cycle of approximately 50% whereas the signal 13A in FIG. 2(d) has a duty cycle of approximately 90%.

FIG. 2(e) shows an abnormal state wherein a pulse is masked for one frame relative to the control signals 13A and 13B for generating the normal pattern as shown in FIG. 2(d), whereby no violation is generated at all for exending one frame.

A diagnosis method for diagnosing the forward guarding stage at the terminal to be tested will be described hereinafter.

When one terminal to be tested is connected to the circuit of FIG. 1 under the state as illustrated in FIG. 2(d), the INFO 2 or the INFO 4 is supplied from the transmission transformer 5 in FIG. 1 as the frame alignment signal. The terminal to be tested responds by the INFO 3 so that the alignment prune operation is effected.

When the control signals 13A and 13B are converted from the pattern as illustrated in FIG. 2(d) to the pattern as illustrated in FIG. 2(e) where the pulse for one frame is masked, the INFO signal 22 in FIG. 1 is kept as INFO 3. That is, even if the violation generation is prohibited for one frame, the alignment state is kept continued.

When the control signals 13A and 13B are converted into the pattern in which two consecutive frame pulses are masked, the INFO signal 22 in FIG. 1 is changed from the INFO 3 to the INFO 0. That is, when the violation generation is prohibited for two consecutive frames, the frame unalignment is occured. Accordingly, the number of the forward guarding stage of the terminal to be tested is two stages.

As mentioned above, it is possible to diagnose the forward guarding stage by increasing successively the number of the consecutive masked frame pulses of the control signal 13B every frame of the control signals 13A and 13B until the frame unalignment is occured between the TE and the NT. That is, the control signal 13B is less appeared while the control signal 13A is frequently appeared.

In the same way, it is possible to diagnose the backward guarding stage by increasing successively the number of the consecutive masked frame pulses of the control signal 13A every frame of the control signals 13A and 13B until alignment prune operation is effected between the TE and the NT. That is, the control signal 13A is less appeared while the control signal 13B is frequently appeared.

In the same manner, it is possible to diagnose the guarding stage by increasing or decreasing the frame which does not depend on 14 bits rule employing the pattern as illustrated in FIG. 2(f) instead of increasing or decreasing the violation generation prohibition frame as made in FIG. 2(e).

The diagnosing method set forth above is exemplified with use of the diagnosing apparatus having the DSU function. However, the diagnosing method can be applied to the diagnosing apparatus having the terminal function. It is possible to employ separately a monitor apparatus in the circuit of FIG. 1 as a state monitor of the apparatus to be tested.

With the arrangement and operations set forth above, it is possible to diagnose the alignment guarding rule by detecting the forward guarding stage or the backward guarding stage of the frame alignment of the terminal or the DSU since it is possible to generate the frame having the normal violation rule, enlarge or vary the violation generation range and effecting the violation generation prohibition for unit frame.

Although the invention has been described in its preferred form with a certain degree of paticularity, it is to be understood that many variations and changes are possible in the invention without departing from the scope thereof.

What is claimed is:

1. A violation control circuit in ISDN comprising:
   a first selector having a first input connected to a negative polarity pulse transmission signal and a second input connected to a positive polarity pulse transmission signal;
   a second selector having a first input connected to the positive polarity pulse transmission signal and a second input connected to the negative polarity pulse transmission signal;
   a selector control circuit for providing a first control signal which causes said first selector to connect the first input of the first selector to an output of the first selector and causes said second selector to connect the first input of the second selector to an output of the second selector, and for providing a second control signal which causes said first selector to connect the second input of the first selector to the output of the first selector and causes said second selector to connect the second input of the second selector to the output of the second selector;
   a unipolar to bipolar converter for receiving the output of the first selector and the output of the second selector;
   a transmission transformer for receiving an output of the unipolar to bipolar converter;
   a receiving transformer for receiving a receiving pulse;
   a bipolar to unipolar converter for receiving an output of the receiving transformer; and
   an INFO detecting circuit connected to an output of the bipolar to unipolar converter.

2. A circuit according to claim 1, wherein said selector control circuit has a select output which is coupled to a select input on each of said selectors which carries a select signal having first and second logical states, said first control signal being said first logical state of said select signal and said second control signal being said second logical state of said select signal.

3. An apparatus according to claim 2, wherein said selector control circuit includes means for switching said select signal between said first and second logical states thereof according to a predetermined pattern.

4. An apparatus according to claim 5, wherein said selector control circuit includes means for varying the relative periods of time during which said select signal is respectively in said first logical state and said second logical state.

5. An apparatus according to claim 4, wherein said INFO detecting circuit includes means for detecting a change in a signal at said output of said bipolar to unipolar converter after said selector control circuit varies said relative periods of time during which said select signal is respectively in said first and second logical states.

6. An apparatus according to claim 5, wherein said INFO detecting circuit includes means for detecting a change in a signal at the output of said bipolar to unipolar converter after said selector control circuit effects said inhibiting of said transition in said select signal.

7. An apparatus according to claim 3, wherein said selector control circuit includes means for selectively inhibiting a transition of said select signal from one of said first and second logical states to the other thereof and then back to said one of said states according to said pattern.

* * * * *